(12) United States Patent
Liang et al.

(10) Patent No.: US 10,857,513 B2
(45) Date of Patent: Dec. 8, 2020

(54) BIOMASS GRANULATOR

(71) Applicant: ANHUI DINGLIANG TECHNOLOGY ENERGY CO., LTD., Guangde County (CN)

(72) Inventors: Nianxi Liang, Guangde County (CN);
Jingbo Ruan, Guangde County (CN);
Kelong Xiao, Guangde County (CN);
Lingli Lu, Guangde County (CN);
Jingdong Wang, Guangde County (CN)

(73) Assignee: ANHUI DINGLIANG TECHNOLOGY ENERGY CO., LTD., Guangde County (CN)

( * ) Notice: Subject to any disclaimer, the term of this patent is extended or adjusted under 35 U.S.C. 154(b) by 320 days.

(21) Appl. No.: 15/512,008

(22) PCT Filed: Nov. 8, 2016

(86) PCT No.: PCT/CN2016/104966
§ 371 (c)(1),
(2) Date: Mar. 19, 2017

(87) PCT Pub. No.: WO2018/085968
PCT Pub. Date: May 17, 2018

(65) Prior Publication Data
US 2019/0151812 A1     May 23, 2019

(51) Int. Cl.
*B01J 2/22* (2006.01)
*B01J 2/10* (2006.01)
*B01J 2/20* (2006.01)
*B27N 5/00* (2006.01)
*C10L 5/44* (2006.01)

(52) U.S. Cl.
CPC .... *B01J 2/22* (2013.01); *B01J 2/10* (2013.01);
*B01J 2/20* (2013.01); *B27N 5/00* (2013.01);
*C10L 5/44* (2013.01); *C10L 2200/0469*
(2013.01); *C10L 2290/28* (2013.01)

(58) Field of Classification Search
CPC ..... B29C 67/00; B29C 64/223; B29C 64/357;
B29C 64/135; B29C 2791/002; B29V 2791/001
USPC ........................................ 425/80.1
See application file for complete search history.

(56) References Cited

U.S. PATENT DOCUMENTS

| | | | | |
|---|---|---|---|---|
| 4,446,086 | A * | 5/1984 | Molenaar | ............. B01J 2/20 264/118 |
| 5,383,609 | A * | 1/1995 | Prater | ................ B01J 2/22 241/222 |
| 2012/0304535 | A1* | 12/2012 | Bai | ............... C10L 5/06 44/589 |

(Continued)

FOREIGN PATENT DOCUMENTS

CN          201529510 U     7/2010

*Primary Examiner* — Robert C Dye
*Assistant Examiner* — Guy F Mongelli
(74) *Attorney, Agent, or Firm* — Emerson, Thomson & Bennett, LLC; Roger D. Emerson

(57) ABSTRACT

A biomass granulator is described herein. In some embodiments, in the biomass granulator, the primarily molded particles extruded from the ring-shaped die are subjected to an orderly, quantitative and uniform reformation via a rotating scraper provided, as well as timely delivery of the finally molded particles out of the biomass granulator.

9 Claims, 4 Drawing Sheets

(56) References Cited

U.S. PATENT DOCUMENTS

2014/0209093 A1* 7/2014 Medoff .................... C10L 5/46
                                                    127/42
2015/0099902 A1* 4/2015 Beldring .................. B01F 3/06
                                                    568/840

* cited by examiner

BIOMASS GRANULATOR

RELATED APPLICATIONS

This application claims the benefit of prior international application PCT/CN2016/104966 filed Nov. 18, 2016 and having the same title and inventors as the present application; which is fully incorporate herein by reference.

BACKGROUND OF THE INVENTION

1. Technical Field

The present invention relates to the field of extrusion granulation machinery, and more especially, to a biomass granulator.

2. Description of Related Art

Biomass fuel is a new environmentally-friendly blocky energy produced by processing straw, rice straw, rice husk, peanut shell, corn cob, camellia shell, cotton seed shell and the "three remains". Biomass particle burners are widely used in various thermal energy industries such as boiler, die-casting machine, industrial furnace, incinerator, melting furnace, kitchen equipment, drying equipment, food drying equipment, ironing equipment, paint equipment, road construction machine and equipment, industrial annealing furnace and asphalt heating equipment. With the widespread application of biomass particles, the society nowadays has higher requirements for them. In accordance with the biomass particle classification standards in Sweden and the EU, the biomass particles are generally described to have the following characteristics—physical characteristics of biomass particles defined as follows: the diameter is generally 6~10 mm, the length is 4~5 times as long as its diameter and the water content of dry basis is less than 15%, and meanwhile the standards also present that the crushing rate of biomass particles is less than 1.5%~2.0%. When a biomass particle meets the above physical characteristics, it becomes dry and brittle, and the existing granulator mainly extrudes materials out of the hole of a ring-shaped die to turn them into particles through the strong extrusion function of the ring-shaped die and a pressing roller. The structure not only depends too much on the physical extrusion, but also lacks a rationally fitting structure for the timely and quick formation of primarily molded particles that have been extruded, so in actual production, it is a very common phenomenon that the primarily molded particles will crush and extrude with each other in the existing granulator, which makes the existing granulator incapable of achieving a crushing rate of less than 1.5%~2.0% in operation. The requirement can only be guaranteed by post-processing equipment such as a screening machine; therefore, the problems mentioned above result in the insufficiency of both productivity and actual yield per unit achieved in the prior art.

A biomass granulator, as disclosed in the Chinese Patent No. CN103920422, comprises a granulation chamber, a pressing wheel assembly and a driving mechanism. It introduces three symmetric eccentric wheels to ensure the uniform force exerted on the equipment so that it is not easy to be damaged. The ring-shaped die is fixed by a die sleeve for fixation and positioning. A positioning plate can be used for stably connecting the upper and lower pressing trays. The technical solution of the invention is provided only for improving the service life of the granulator itself, and the specific mechanical structure used does not have too much effect on the efficient production of the standard biomass particles. Meanwhile, it shall be noted from the embodiments that the technical solution is actually aimed to make raw materials extruded out of the ring-shaped die through the eccentric wheel and then the biomass particles segmented via the blocking action of the side wall of the die sleeve and the inter-extrusion effect of the primarily molded particles together and finally formed into small-sized molded particles. The actual size of the finally molded particles via the technical solution is uncontrollable, the same batch of biomass particles has poor consistency and high rate of breakage; obviously, it fails to give any effective solution to the above-mentioned technical problems.

BRIEF SUMMARY OF THE INVENTION

In view of the shortcomings of the prior art, the present invention provides a biomass granulator in which the primarily molded particles extruded from the ring-shaped die are subjected to an orderly, quantitative and uniform reformation via a rotating scraper provided, as well as timely delivery of the finally molded particles out of the biomass granulator, thus solving the technical problems of the present invention. The technical solution of the present invention is to provide a biomass granulator comprising a granulation chamber which is provided with a feed inlet and a discharge outlet and divided into a primary molding chamber and a secondary molding chamber by a ring-shaped die, wherein the secondary molding chamber is arranged surrounding the outside of the primary molding chamber and the primary molding chamber is provided inside with a pressing wheel mechanism comprising a wheel seat on which at least two symmetrical eccentric pressing rollers are provided. The eccentric pressing rollers are disposed with threads on the surface where a guide groove is provided between the adjacent threads; the ring-shaped die is provided outside with a plurality of scrapers taking the axis of the main shaft as the axis of rotation, and the contact point of the eccentric pressing roller and the ring-shaped die is always located between adjacent scrapers.

Preferably, the gap distance between the side edge of the scraper and the inside wall of the secondary molding chamber is 0 mm~2 mm.

Preferably, the invention further comprises a rotating tray, which is rotatably arranged relative to the ring-shaped die with its axis of rotation coinciding with the axis of the ring-shaped die; the rotating tray is connected with a scraper below itself as well as one output end of the driving mechanism.

Preferably, the gap distance between any adjacent eccentric pressing rollers are equal, and all included angles α formed by the diameter of any adjacent eccentric pressing rollers passing through the axis of rotation intersected with the line between its axis of rotation and the axis of rotation of the wheel seat are equal.

Preferably, the angular speed of rotation of the scraper is N times as high as that of the wheel seat, wherein N is equal to 1, 2, 3 or 4.

Preferably, the linear speed of rotation of the eccentric pressing roller is higher than that of the scraper. Preferably, the driving mechanism comprises a scraper's driving device and a wheel seat's driving device; the scraper's driving device comprises a first motor, a first reducer box and a first drive gear; wherein the first reducer box is connected with the output end of the first motor as well as the first drive gear, and the outer edge of the rotating tray is provided with teeth engaged with the first drive gear so that the rotating wheel tray and the first drive gear are engaged. The wheel seat's driving device comprises a second drive motor, an active drive gear and a second drive gear, wherein the active drive gear is connected with the second drive gear via a transmission gear, the output end of the second drive motor is connected with the active drive gear and the second drive gear is connected at its axis of rotation with the main shaft.

Preferably, a support platform is provided above the ring-shaped die, with the surface of the support platform in a plane where it is located perpendicular to the inside of the scraper, and support rollers are provided below the rotating tray and contact the supporting plane of the support platform.

Preferably, the invention further comprises a material chamber's shell, which is provided above the ring-shaped die, and the inner space of the material chamber's shell forms a raw material chamber which connects the feed inlet and the primary molding chamber.

Preferably, the raw material chamber is provided with a pressing-material tray, which is fixedly connected with the scraper via a connecting rod, wherein the surface of the pressing-material tray is disposed with a leaking-material groove spirally surrounding the axis of rotation, and the pressing-material tray is gradually recessed from the axis of rotation toward the direction of the side edge.

The beneficial effects of the present invention are as below:

1. The present invention brings a high granulation efficiency and ensures the consistency of granulation.

2. The present invention is capable of preventing the finally molded particles from being damaged to the maximum extent, which saves the post-processing equipment in the establishment of the production line, thus improving the quality of finished products and meanwhile reducing the cost of production.

Figure 1:
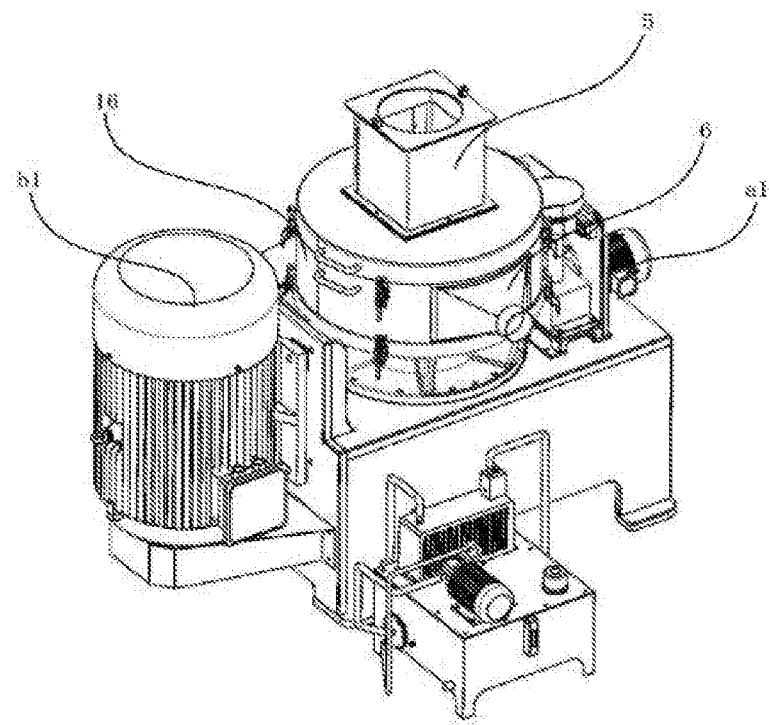
FIG. 1 is a three-dimensional structure diagram of the present invention.

In the figures, 1—ring-shaped die; 2—wheel seat; 3—eccentric pressing roller; 4—scraper; 5—feed inlet; 6—discharge outlet; 7—main shaft; 8—primary molding chamber; 9—secondary molding chamber; 10—insulated chamber; 11—rotating tray; 12—support platform; 13—support roller; 14—material chamber's shell; 15—raw material chamber; 16—material chamber's shell; 17—threads; 18—guide groove; 19—pressing-material tray; 19-1—leaking-material groove; a1—first motor; a2—first reducer box; a3—first drive gear; b1—second drive motor; b3—active drive gear; b4—second drive gear; b5—transmission gear.

DETAILED DESCRIPTION OF THE INVENTION

The present invention is further detailed in combination with the drawings as follows.

As shown in FIG. 1, FIG. 2, FIG. 3, FIG. 4 and FIG. 7, the embodiment of the present invention comprises a granulation chamber which is provided with a feed inlet 5 and a discharge outlet 6, a pressing-wheel mechanism rotatably provided in the granulation chamber, and a driving mechanism which is connected with the pressing-wheel mechanism via a main shaft 7 and drives the pressing-wheel mechanism to rotate. The granulation chamber is provided inside with a ring-shaped die 1 which has a metal ring with a certain thickness, and disposed with a discharge outlet's through-hole on its side wall, wherein the axis of each through-hole is parallel to each other and perpendicular to the axis of the ring-shaped die 1; the ring-shaped die 1 divides the granulation chamber into a primary molding chamber 8 and a secondary molding chamber 9, wherein the secondary molding chamber 9 is arranged surrounding the outside of the primary molding chamber 8, that is, the primary molding chamber 8 is constituted by a circular space inside the ring-shaped die 1, and the secondary molding chamber 9 is constituted by an annular space outside the ring-shaped die 1; the feed inlet 5 is communicated with the primary molding chamber 8 and the discharge outlet 6 is communicated with the secondary molding chamber 9, with the pressing-wheel mechanism provided inside the primary molding chamber 8. This embodiment is also provided with a material chamber's shell 14 and an outer shell 16, wherein the material chamber's shell 14 is provided above the ring-shaped die 1 and a raw material chamber 15 used for connecting the feed inlet 5 and the primary molding chamber 8 is formed in the inner space of the material chamber's shell 14. The raw material chamber 15 is provided with a pressing-material tray 19, which is used for guiding raw materials in the raw material chamber 15 downwards, to make the raw materials enter into the primary molding chamber 8 in a tight state. The pressing-material tray 19 and the scraper 4 are fixedly connected by means of a connecting rod, thus saving a power unit. The surface of the pressing-material tray is disposed with a leaking-material groove 19-1 spirally surrounding the axis of rotation, thus forming a swirling leaking-groove structure so that the pressing-material tray 19 can be rotated and gradually recessed from the axis of rotation toward the direction of the side edge. The discharge outlet 6 is provided in the sidewall of the outer shell 16, and the axial center line of the discharge outlet 6 is parallel to the plane of rotation of the scraper 4. In this way, the finally molded particles can be ejected out of the discharge outlet 6 by the centrifugal force when the scraper 4 is rotated to the discharge outlet 6; if it is provided at other portions, the discharge port 6 is easy to be blocked and the finally molded particles in the insulated chamber 10 cannot be extruded timely in the clogged state, thus resulting in stacking which enhances the extruding force between the finally molded particles and may cause a severe damage of the particles. It shall be noted that the provision of the discharge outlet 6 at the bottom of the secondary forming chamber 9 will destroy the integrity of the secondary molding chamber 9, and result in the frequent entrainment of particles between the scraper 4 and the discharge outlet 6 in actual tests, as well as the blocking of the discharge outlet 9 upon stacking of a large number of finally molded particles at the bottom due to the gravitational force.

Figure 2:
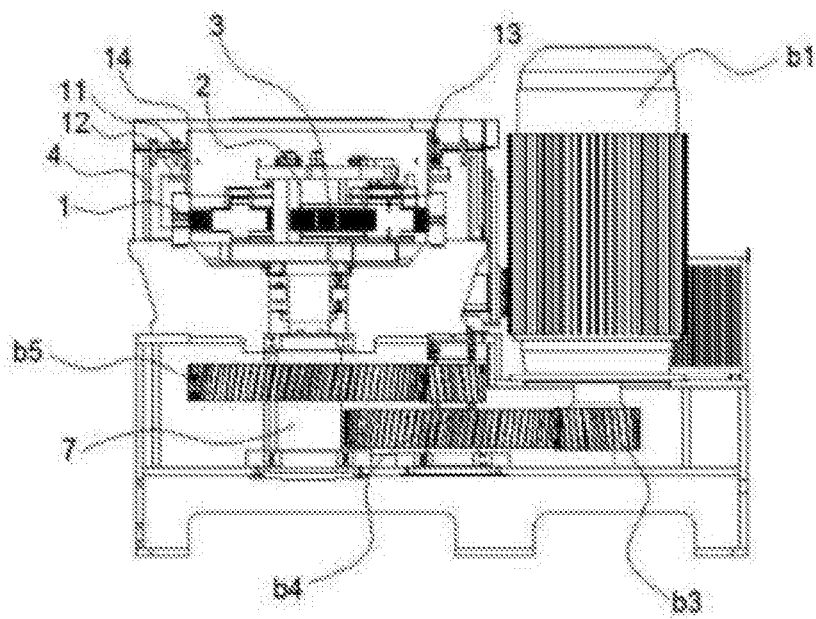
FIG. 2 is a sectional view of the present invention.
Figure 3:
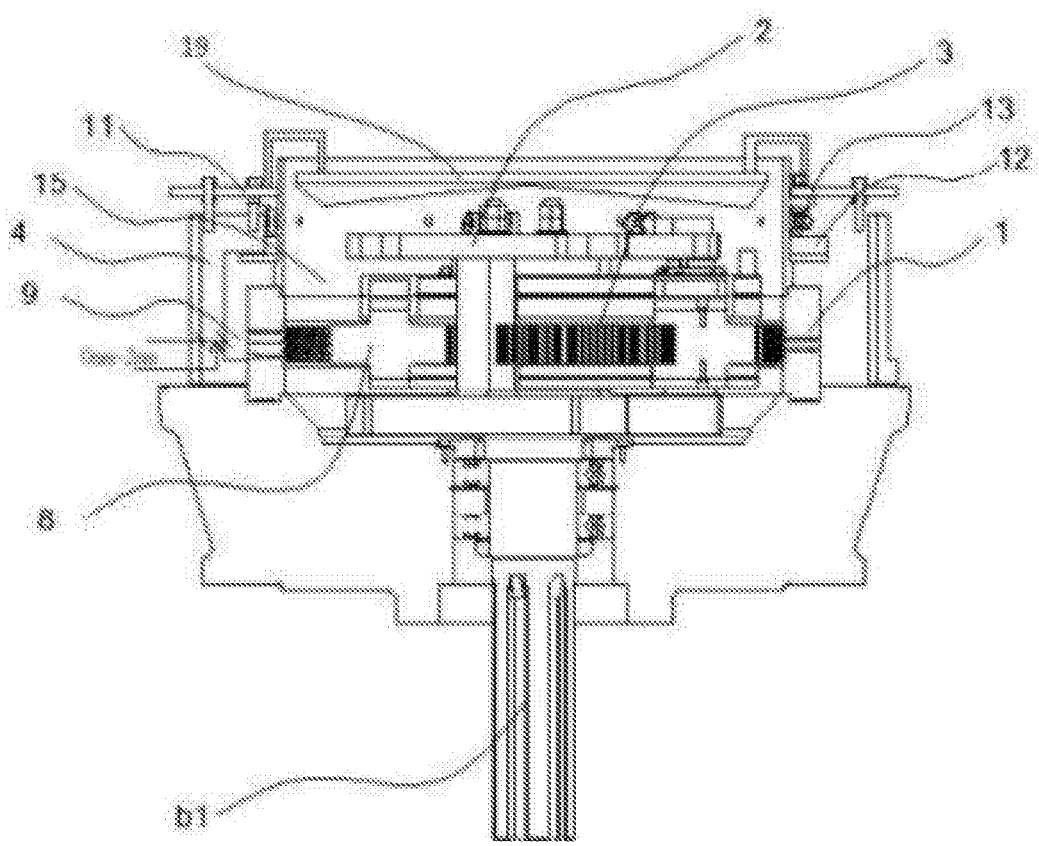
FIG. 3 is a structural diagram of the pressing wheel of the present invention.
Figure 4:
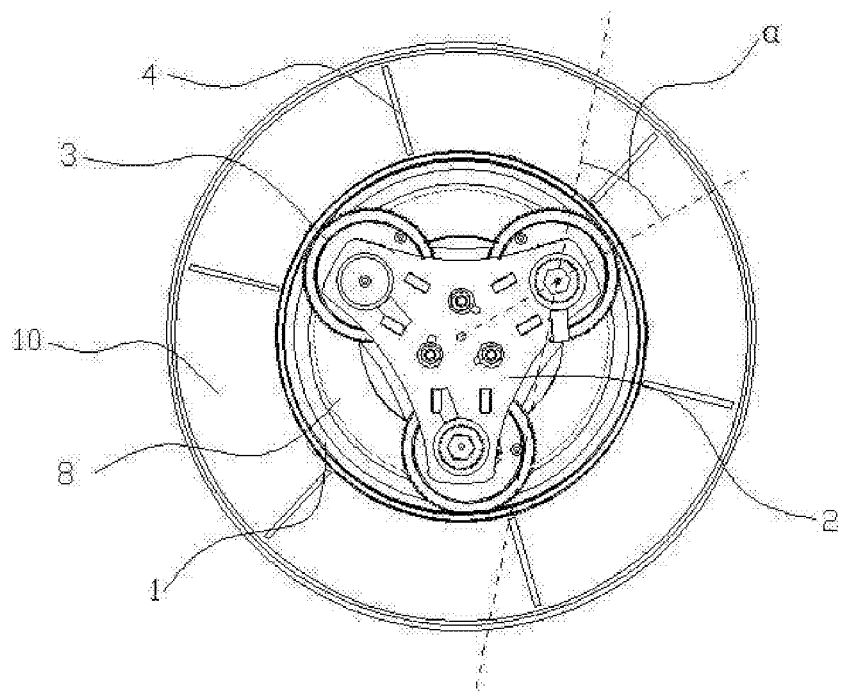
FIG. 4 is a top view of the pressing wheel of the present invention.

As shown in FIGS. 1 to 4, the pressing-wheel mechanism comprises a wheel seat 2 and eccentric pressing rollers 3, wherein at least two eccentric pressing rollers 3 are rotatably connected on the wheel seat 2, with the number being two, three and four typically. The wheel seat 2 is connected to the main shaft 7, that is, the actual axis of rotation of the wheel seat 2 coincides with the axis of rotation of the main shaft 7 and the axis of rotation of the eccentric pressing roller 3 is parallel to the axis of rotation of the main shaft 7, as shown in FIGS. 2 to 4; the ring-shaped die 1 is provided outside with scrapers taking the axis of the main shaft 7 as the axis of rotation at least, so that when the eccentric pressing roller 3 and the scraper 4 rotate together, the contact point of the surface of the eccentric pressing roller 3 and the inner surface of the ring-shaped die 1 is always located between adjacent scrapers; in this embodiment, the scraper 4 provided is used for scraping off the primarily molded particles extruded out of the ring-shaped die 1 at a certain frequency so as to complete the step of segmenting the primarily molded particles into finally molded particles. Meanwhile, an insulated chamber 10 is formed between adjacent scrapers; since the rotating speeds of individual parts are set at a constant rate during the operation of this embodiment, the number of the finally molded particles in each of the insulated chambers 10 remains constant, and the specific number can be controlled by respectively adjusting the individual rotating speed of the eccentric pressing roller 3, the wheel seat 2 and the scraper 4, so that the technical solution of this embodiment can ensure that the finally molded particles in each of the insulated chambers 10 will not be damaged by the extruding force exerted on themselves before they are pushed by the scraper 4 toward the discharge outlet 6. When the eccentric pressing roller 3 and the scraper 4 in this embodiment are rotated simultaneously, it is necessary to ensure that the contact point of the surface of the eccentric pressing roller 3 and the inner surface of the ring-shaped die 1 is always located between the adjacent scrapers 4, so as to prevent the scrapers 4 from impacting the normal discharge of the ring-shaped die 1 which may lead to the reduction of the material particle fullness and structural damage; in this embodiment the rotating speeds of individual parts are set at a constant rate and the individual rotating speeds of the eccentric pressing roller 3, the wheel seat 2 and the scraper 4 can be respectively controlled, so that the technical solution can be achieved just in a simple and convenient way through the coordinated rotating speeds of individual parts.

The gap distance between the side edge of the scraper 4 and the inside wall of the secondary molding chamber 9 is 0 mm~2 mm; since the length of ordinary biomass particles is not more than 10 mm, the maximum gap distance set to 2 mm or less can effectively prevent particles from entering into the adjacent insulated chamber 10 through the gap, and also prevent them being blocked in these gaps and damaged by the rotation; in case the size is set to more than 2 mm, when the length of particles is 6 mm or less, the ratio of these gaps relative to the length of particles is ⅓ or more, which is easy to make the particles blocked in these gaps on the side edges of their end faces; in case the size is set to zero, the scraper 4 will be in too sufficient contact with the secondary molding chamber 9 which results in the blocking of rotation of the scraper 4 which is likely to become blunt and cannot rotate at a constant speed actually, thus destroying the intended effect of this embodiment.

As shown in FIGS. 2 to 3, the embodiment of the present invention further comprises a rotating tray 11 which is rotatably arranged relative to the ring-shaped die 1 with its axis of rotation coinciding with the axis of the ring-shaped die 1; the scraper 4 is connected below the rotating tray 11 with specific methods as follows: it can either be fixedly connected via connectors such as screws, or connected to the rotating tray 11 allowing up and down adjustment along the perpendicular direction and fastened by fasteners such as fastening screws; one output end of the driving mechanism is connected with the rotating tray 11. A support platform 12 is provided above the ring-shaped die 1, with the surface of the support platform 12 in a plane where it is located perpendicular to the inside of the scraper 4, and support rollers 13 are provided below the rotating tray 11 and contact the supporting plane of the support platform 12.

As shown in FIG. 4, the gap distance between any adjacent eccentric pressing rollers in this embodiment are equal, and all included angles α formed by the diameter of any adjacent eccentric pressing rollers passing through the axis of rotation intersected with the line between its axis of rotation and the axis of rotation of the wheel seat are equal, that is, no matter whether the pressing-wheel mechanism is in a rotating state or a stationary state, the eccentric pressing rollers 3 are evenly distributed on the wheel seat 2 equally in distance and all of the eccentric pressing rollers 3 are equal in the angle of deflection relative to the wheel seat 2; inventors found in tests that this arrangement allows the ring-shaped die 1 to be subjected to a uniform and symmetrical force on its inner wall during its operation, and this symmetry is effective for the ring-shaped die 1 to have a longer service life thanks to the uniform force which can be ensured, and more important, this symmetrical and uniform arrangement ensures that the discharge quantity and speed of the discharge through-holes in each set of symmetrical positions of the ring-shaped die 1 are equal, so as to further ensure that the number of the finally molded particles in each of the insulated chambers 10 remains substantially equal, with the measured tolerance rate of less than 10; however, the arrangement in the prior art seemingly can ensure the same number but actually not, since it only emphasizes uniform distribution: the rotation axes of the eccentric pressing rollers 3 are not in their actual axis, so if the relative deflection angle of each eccentric pressure roller 3 cannot be controlled, the design concept of uniform distribution will not play an effective role in the process of actual operation.

Figure 6:
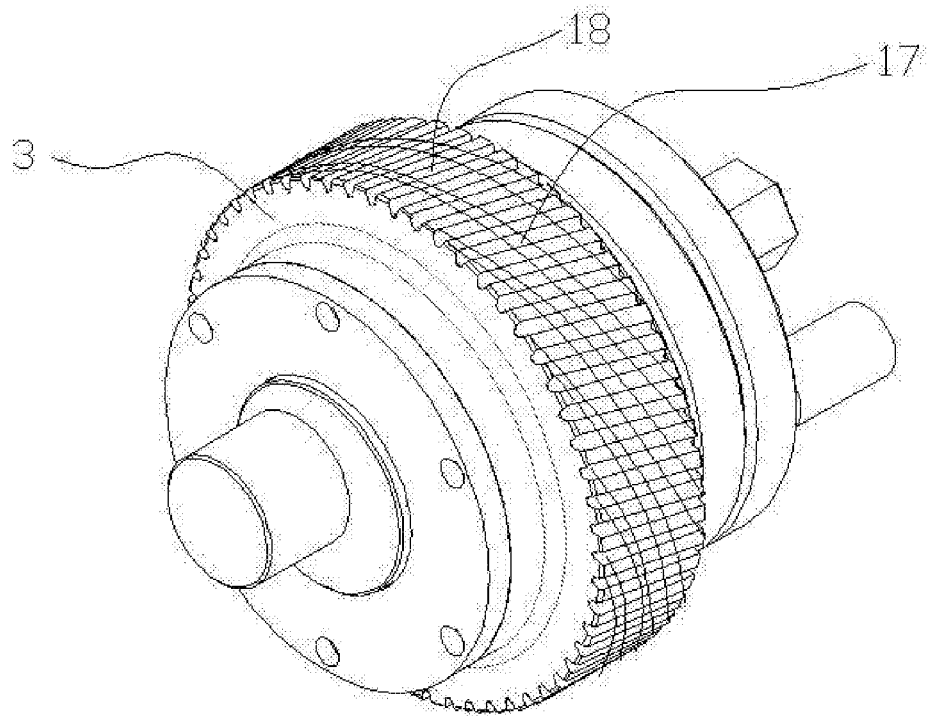
FIG. 6 is a structural diagram of the eccentric pressing roller of the present invention.
Figure 7:
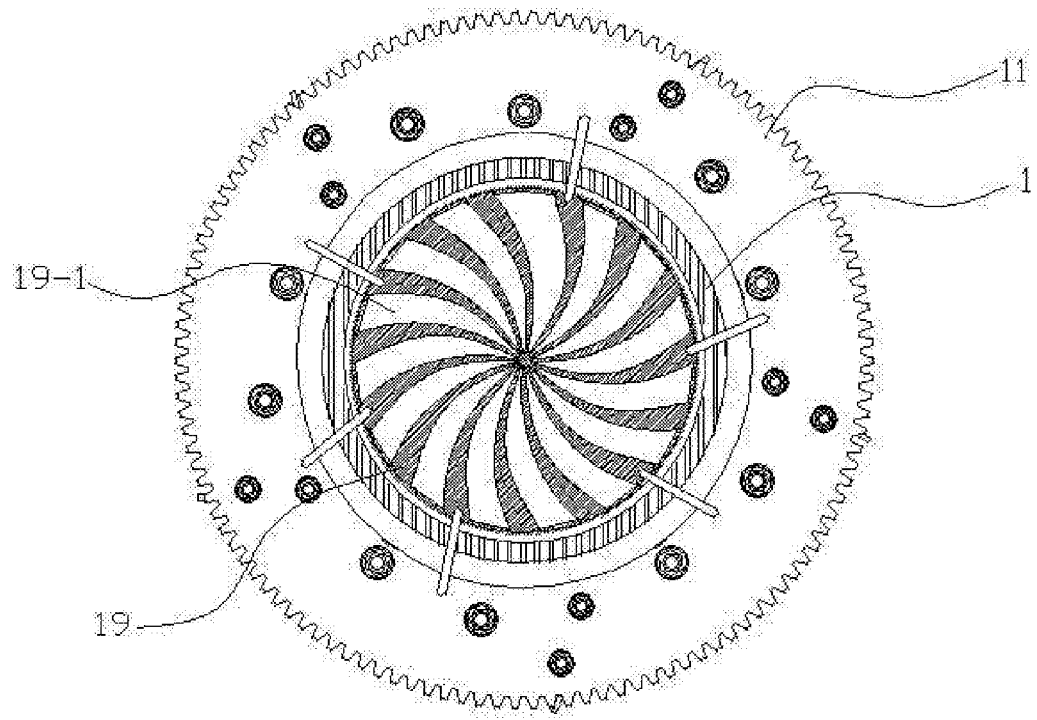
FIG. 7 is a structural diagram of the pressing-material tray of the present invention.

As shown in FIG. 6, in this embodiment, the eccentric pressing rollers 3 are disposed with threads 17 on the surface where a guide groove 18 is provided between the adjacent threads 17; the groove's center line of the guide groove 18 is obliquely arranged relative to the axis of rotation of the eccentric pressing rollers 3; the threads 17 press down the materials dropped from the upper side during the rotation of the eccentric pressing rollers 3, and meanwhile the guide groove 18 can further crush the raw materials in the rotation process of the eccentric pressing rollers 3 and further presses down the crushed raw materials, keeping the raw materials tight and solid when they are finally extruded out of the ring-shaped die 1 so as to reduce the damage ratio.

The angular speed of rotation of the scraper 4 in this embodiment of the present invention is N times as high as that of the wheel seat 2, wherein N is equal to 1 or 2 or 3 or 4; in this embodiment, the angular speeds of rotation of the scraper 4 and the wheel seat 2 must remain at an integer ratio, so as to ensure that the primarily molded particles extruded out of the ring-shaped die 1 can be scraped off at a fixed frequency by the scraper 4 and formed into the finally molded particles of equal physical sizes, with the multiple of N not exceeding 5; in case N exceeds 5 in an actual test, the speed of rotation of the scraper 4 relative to the wheel seat 2 will be too high to crush the particles, and it shall be noted that N is equal to 1 upon the reverse rotation of the scraper 4 relative to the wheel seat 2, that is, the angular speed of rotation of the scraper 4 is equal to that of the wheel seat 2, and the angle of rotation of the eccentric pressing roller 3 is adjusted according to the specific length of the finally molded particles required, so that it will not have a direct relationship with the angular speeds of rotation of the scraper 4 and the wheel seat 2. The linear speed of rotation of the eccentric pressing roller 3 is higher than that of the scraper 4; since the water content of the biomass particles is strictly controlled, the biomass particles are normally maintained in a dry state to facilitate combustion; however, the dry biomass particles are easy to be crushed by the scraper 4 in the molding process: when the speed of the scraper 4 is too high, the scraper 4 will have too large kinetic energy, so it is necessary to ensure that the particles will not be crushed by the scraper 4 at a too high speed of rotation in the molding process via the display of such a linear speed.

Figure 5:
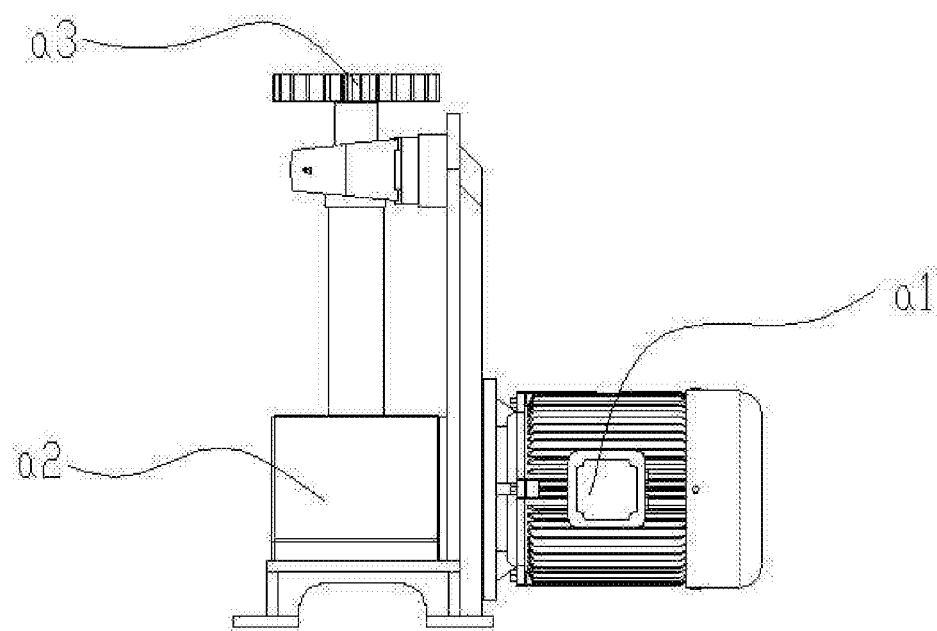
FIG. 5 is a structural diagram of the scraper-driving device of the present invention.

As shown in FIG. 1, FIG. 2 and FIG. 5, the driving mechanism in this embodiment of the present invention comprises a scraper's driving device and a wheel seat's driving device; the scraper's driving device comprises a first motor a1, a first reducer box a2 and a first drive gear a3; wherein the first reducer box a2 is connected with the output end of the first motor a1 as well as the first drive gear a3, and the outer edge of the rotating tray 11 is provided with teeth engaged with the first drive gear a3 so that the rotating wheel tray and the first drive gear a3 are engaged; the wheel seat's driving device comprises a second drive motor b1, an active drive gear b3 and a second drive gear b4, wherein the active drive gear b3 is connected with the second drive gear b4 via a transmission gear b5, the output end of the second drive motor b1 is connected with the active drive gear b3 and the second drive gear b4 is connected at its rotation axis with the main shaft 7; the transmission gear b5 comprises two gears provided in the upper and lower portions, wherein the diameter of the lower gear is larger than the upper gear, with the lower gear engaged with the active drive gear b3 and the upper gear engaged with the second drive gear b4; the eccentric pressing rollers 3 are directly driven by a small drive motor, and each eccentric pressing roller 3 is provided with a separate small motor which is directly provided on the wheel seat 2 and connected to the rotation axis of the eccentric pressing roller 3.

The foregoing are only preferable embodiments used for describing the present invention, but not intended to limit the concept and scope of the present invention. Various modifications or amendments on the technical solution of the invention made by those skilled in the field without deviating from the design concept of the present invention shall all be covered by the protection scope of the invention, and the technical contents claimed for protection have all been recorded in the Claims.

What is claimed is:

1. A biomass granulator, comprising a granulation chamber which is provided with a feed inlet (5) and a discharge outlet (6), characterized in that the granulation chamber is divided into a primary molding chamber (8) and a secondary molding chamber (9) by a ring-shaped die (1), wherein the secondary molding chamber (9) is arranged surrounding an outside of the primary molding chamber (8) and the primary molding chamber (8) is provided inside with a pressing wheel mechanism comprising a wheel seat (2) on which at least two eccentric pressing rollers (3) that are symmetrical are provided; the eccentric pressing rollers (3) are disposed with a plurality of overlapping threads (17) are disposed on a surface of each eccentric pressing roller (3) at an angle with respect to an axis of the rotation of the eccentric pressing rollers (3); a guide groove (18) is provided between the adjacent threads (17) on the surface of each eccentric pressing roller (3), the guide groove (18) has a groove's center line obliquely arranged relative to an axis of rotation of the eccentric pressing rollers (3); the ring-shaped die (1) is provided outside with a plurality of scrapers (4) taking the axis of a main shaft (7) as the axis of rotation, and the contact point of the eccentric pressing roller (3) and the ring-shaped die (1) is always located between adjacent scrapers (4);
   wherein the biomass granulator further comprises a driving mechanism comprising a scraper's driving device; the scraper's driving device comprises a first motor (a1), a first reducer box (a2) for moving the eccentric pressing rollers (3) at different speeds, and a first drive gear (a3); wherein the first reducer box (a2) is connected with an output end of the first motor (a1) as well as the first drive gear (a3);
   wherein the discharge outlet (6) is provided in the sidewall of an outer shell (16), and the axial center line of the discharge outlet (6) is parallel to the plane of rotation of the scraper (4);
   the gap distance between the side edge of the scraper (4) and the inside wall of the secondary molding chamber (9) is 0 mm~2 mm.

2. The biomass granulator as claimed in claim 1, characterized in that, further comprising a rotating tray (11) which is rotatably arranged relative to the ring-shaped die (1) with its axis of rotation coinciding with the axis of the ring-shaped die (1); a scraper (4) is connected with the rotating tray (11) below the rotating tray (11) as well as one output end of the driving mechanism connected with the rotating tray (11).

3. The biomass granulator as claimed in claim 1, characterized in that the gap distance between any adjacent eccentric pressing rollers (3) are equal, and all included angles α formed by a straight line from the axis of rotation of the pressing roller (3) to the axis of rotation of the wheel seat (2) and a straight line from the axis of rotation of the pressing roller (3) to the outermost point on the leading edge or retreating edge of the adjacent eccentric pressing rollers (3) are equal.

4. The biomass granulator as claimed in claim 1, characterized in that the scraper (4) has an angular speed of rotation N times as fast as what the wheel seat (2) has, wherein N is equal to 1 or 2 or 3 or 4.

5. The biomass granulator as claimed in claim 4, characterized in that the eccentric pressing roller (3) has a linear speed of rotation faster than what the scraper (4) has.

6. The biomass granulator as claimed in claim 2, characterized in that the driving mechanism further comprises a wheel seat's driving device; and an outer edge of the rotating tray (11) is provided with teeth engaged with the first drive gear (a3) so that the rotating wheel tray and the first drive gear (a3) are engaged; the wheel seat's driving device comprises a second drive motor (b1), an active drive gear (b3) and a second drive gear (b4), wherein the active drive gear (b3) is connected with the second drive gear (b4) via a transmission gear (b5), the output end of the second drive motor (b1) is connected with the active drive gear (b3) and the second drive gear (b4) is connected at its axis of rotation with the main shaft (7).

7. The biomass granulator as claimed in claim 2, characterized in that a support platform (12) is provided above the ring-shaped die (1), with a surface of the support platform (12) in a plane where it is located perpendicular to an inside of the scraper (4), and support rollers (13) are provided below the rotating tray (11) and contact the supporting plane of the support platform (12).

8. The biomass granulator as claimed in claim 1, characterized in that the biomass granulator further comprises a material chamber's shell (14) which is provided above the ring-shaped die (1), and an inner space of the material chamber's shell (14) forms a raw material chamber (15) which connects the feed inlet (5) and the primary molding chamber (8).

9. The biomass granulator as claimed in claim 8, characterized in that the raw material chamber (15) is provided with a pressing-material tray (19) which is fixedly connected with the scraper (4) via a connecting rod, wherein the surface of the pressing-material tray (19) is disposed with a leaking-material groove (19-1) spirally surrounding the axis of rotation, and the pressing-material tray (19) is gradually recessed from the axis of rotation toward the direction of the side edge.

* * * * *